Aug. 1, 1967  G. W. HODGSON ET AL  3,333,901
METHOD AND APPARATUS FOR TRANSPORTING
PACKAGE MATERIAL IN A PIPELINE
Original Filed Feb. 28, 1966
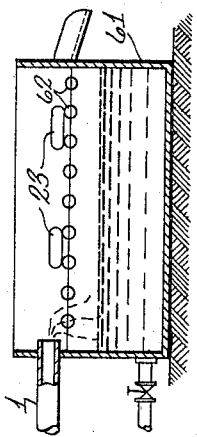
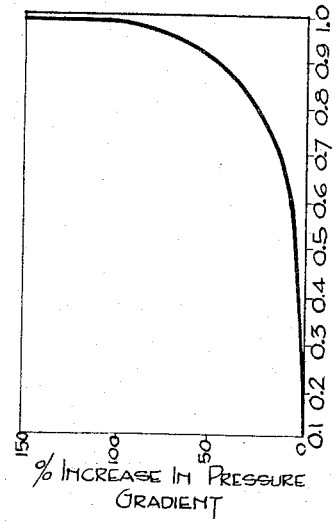
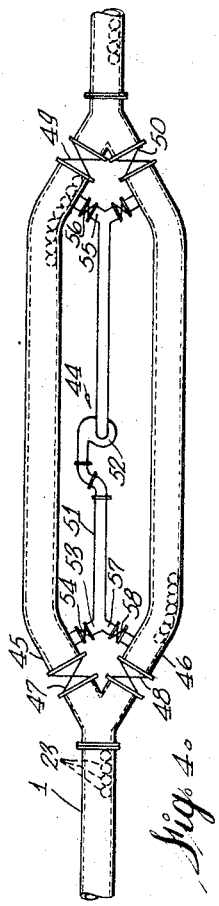
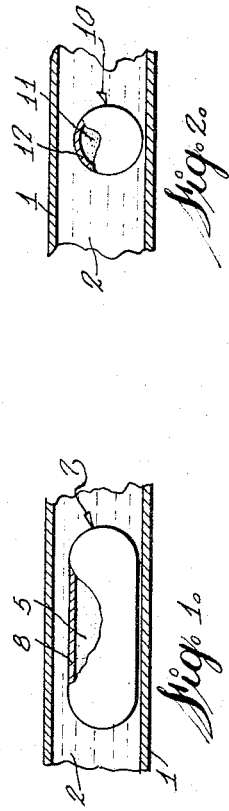
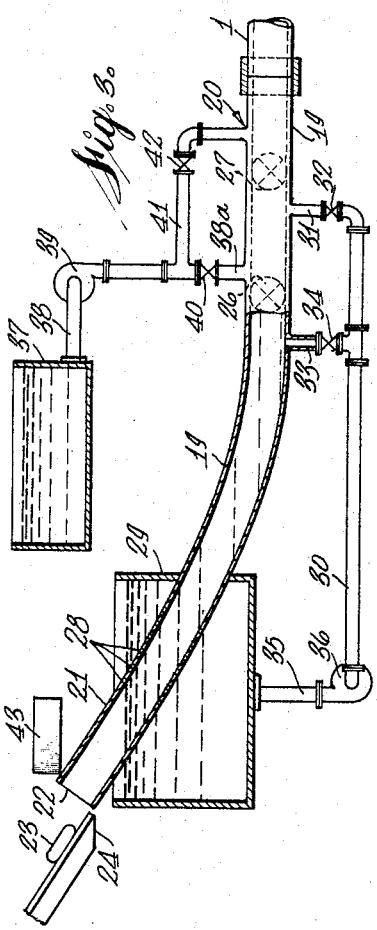

3,333,901
METHOD AND APPARATUS FOR TRANSPORTING PACKAGE MATERIAL IN A PIPELINE
Gordon W. Hodgson, Edmonton, Alberta, and Michael E. Charles, Port Credit, Ontario, Canada, assignors to Research Council of Alberta, Edmonton, Alberta, Canada, a body corporate
Original application Feb. 28, 1966, Ser. No. 530,733. Divided and this application Oct. 21, 1966, Ser. No. 588,570
3 Claims. (Cl. 302—66)

This application is a division of application Ser. No. 530,733, filed Feb. 28, 1966, which is a continuation-in-part of application Ser. No. 324,175 filed Nov. 13, 1963 (now abandoned), which, in turn, was a continuation-in-part of application Ser. No. 131,367, filed Aug. 14, 1961 (now abandoned).

This invention relates to the pipeline transportation of materials in packaged form.

The transportation of materials by pipeline where applicable can be substantially more economical than corresponding transportation by rail or vehicle means, by virute of simplicity of operation and high degree of automation characteristic of pipeline transportation. This has resulted in extensive applications of pipelining procedures to the movements of gases and liquids such as natural gas and petroleum. These applications, however, are essentially limited to situations in which the substance to be transported is more or less directly amenable to flow in a pipeline.

While some applications of pipeline transportation to solids in suspension have been made, they tend to be limited in long distance lines to solids which are not much more dense than the supporting or carrying fluid. Thus, coal and gilsonite can be pipe lined in aqueous suspension, but settling rates for high density powders such as iron and nickel ore concentrates in water demand such high turbulence and, therefore, such high velocities that pressure gradients in suspended solids lines for such materials tend to become prohibitive for long-distance application.

The transportation of solids in suspension may also give rise to other problems such as contamination of the solid by the fluid (for instance, wheat carried in crude oil), difficulty of separation of the solid from the fluid (for instance, finely divided coal from a suspension thereof in water or oil), attrition of the solid during transportation, severe abrasion of the pipe wall, especially in bends and valves, by the solid material, and the need to grind the solid to a small particle size.

Various procedures have heretofore been proposed for transporting materials through pipelines. For instance, it has been proposed to enclose materials in rigid-walled containers of metal or the like and to move such containers pneumatically or hydraulically through the pipeline. However, there are disadvantages associated with such a procedure, these being (a) the cost of manufacture of suitable containers, (b) difficulties involved in the loading and unloading of the containers, and (c) the necessity of providing return transport for the empty containers.

It is an object of this invention to provide a method of transporting solids with a carrying or supporting fluid in a pipeline in a convenient and satisfactory manner whereby the disadvantages set forth above for both slurry and container transport are obviated.

A basic feature of the invention resides in the fabrication of the substances to be transported into coherent shapes, bodies or packages prior to insertion in the pipeline, thereafter transporting the packages in the pipeline and separating the packages from the fluid at the pipeline terminus. It has been determined that bubbles and slugs of oil in water flow in stable configurations in pipes under certain circumstances, and this invention applies this principle to the transportation of packages of substances in pipelines.

The invention will be described with reference to the accompanying drawings, in which FIGURE 1 is a sectional elevation of a portion of a pipeline with a package disposed therein, FIGURE 2 is a sectional elevation of a somewhat modified form of package, FIGURE 3 is a diagrammatic elevation of an apparatus for inserting packages in pipelines, FIGURE 4 is a diagrammatic elevation of a pipeline pumping station, FIGURE 5 is an elevation of one form of package retrieving equipment, and FIGURE 6 is the theoretical relationship between pressure gradient ratio and diameter ratio for the concentric flow of cylindrical packages with a linear fill of 100 percent under turbulent conditions in the fluid carrier.

In accordance with the invention, the material to be transported is initially shaped to produce a multiplicity of shapes of a size which will render them readily receivable in a pipe line and subject to movement therethrough in a supporting fluid. To this end, the shape or package should have an axis of approximate symmetry and an approximate circular contour about such axis the diameter of which is in the range 0.7 to 0.95 times the inside diameter of the pipeline.

The invention contemplates movement of the shapes or packages through the pipeline as part of a supporting or carrying stream flowing through the pipeline. In other words, the package is not driven as a piston through the pipeline by the fluid therein in the manner of separation "pigs" in oil pipelines and "rabbits" or containers in pneumatic systems where the pig, rabbit or container makes substantially complete and continual circumferential mechanical contact with the internal surface of the pipe or tube.

A most suitable and preferred form of shape or package is a cylinder or sphere. A cylindrical package comprises a cylindrical body with a length up to many times its diameter and having flat, concave, convex or ellipsoidal ends. This form of package will assume a position in the transmission pipeline in which the long axis of the package is substantially coincident with, or parallel to, the axis of the pipeline.

A spherical package in accordance with the invention comprises a substantially uniform sphere or a similar shape such as that formed by the revolution of an arc about its chord. Such a package is free to be completely suspended by the carrier fluid or, if in contact with the pipe wall, to both slide and roll along such wall. The carrier fluid may be simply a liquid, or solution or suspension of solid in liquid.

A further basic feature of the invention is the manner of fabrication of the packages which eliminates the need for costly rigid-walled containers which have to be returned to the origin of the pipeline.

Referring to FIGURE 1, 1 is a pipeline having a carrier or supporting fluid 2, such as water, flowing therethrough, and 7 is a package therein in accordance with the invention.

The package consists of a body 5 of granular solids such as sulfur, fertilizer, coal, and various types of ores, concentrates and crystalline salts. A protective shell or outer layer 8 is formed on each body 5 in order to impart the necessary degree of strength thereto. Such a shell could be obtained in many ways; for example, with a flash heat treatment for a fusible granular substance such as sulfur, with a thermal shock treatment for the setting of a thermo-setting resin admixed to the outer layers of the substance, or with a spray chemical activator for the setting of an activator type plastic admixed with the outer layer of the package. The advantage of this type of package is that the solid is very readily recovered once the shell is broken after arrival at the pipeline terminal.

The package shape may be that of a sphere rather than a cylinder, and such a spherical package is shown in FIGURE 2 wherein the package 10 is formed from a granular solid 11 having its surface granules bonded or sintered into a protective outer layer 12.

FIGURE 3 illustrates diagrammatically a suitable form of apparatus for inserting the packages in the pipeline 1. As shown, a pipe 19 is connected to the entrance to the pipeline 1, such pipe 19 having a straight lock section 20 in axial alignment with the pipeline and an upwardly curved section 21 leading to section 20. Section 21 has an open end 22 through which the packages indicated at 23, may be fed as by a chute 24.

Section 20 has a plug valve 26 at the inlet end thereof and a plug valve 27 at the outlet end thereof, section 20 thus constituting a lock.

A portion of pipe section 21 adjacent its entrance 22 is perforated as indicated at 28 and is disposed in a vessel 29. A carrier fluid line 30 has a branch 31 with valve 32 therein leading from the lock between valves 26 and 27 and adajacent valve 27, a branch 33 with valve 34 leading from pipe section 21 adajacent valve 26, and a branch 35 with recirculating pump 36 therein leading to vessel 29.

A carrier fluid supply tank 37 has a supply line 38 leading therefrom and provided with a pump 39 for supplying the fluid under pressure to the pipeline. Line 38 has a branch 38a with valve 40 leading to the lock section 20 and branch 41 with valve 42 leading to the pipeline.

In operation, with valves 42, 26, 32 open and valves 40, 27, 34 closed, carrier fluid is circulated from outlet end of the lock section 20 through line 30, vessel 29, perforated portion 28, and pipe section 21 to the entrance end of lock section 20. A package inserted in section 21 will thus be carried into the lock section 20.

The valves are now reversed, i.e., 42, 26, 32 are closed and 40, 27, 34 opened. The package in the lock section 20 will now be ejected into the pipeline 1.

Any suitable mechanical means may be provided for controlling actuation of the valves described. For instance, the valves may be motor-actuated and a monitor 43 at the entrance 22 employed to detect the entry of a package and actuate the valve motors.

Spacing of the packages in the pipeline may be controlled by (a) size of lock section 20 relative to package size, (b) rate of recirculation by pumps 36, and (c) the linear flow rate in the main pipeline.

It may be desirable to provide auxiliary pumping stations at certain distances along the pipeline. In this connection, it should be pointed out that the present transportation system is believed to be of most practical significance when the transportation distance is of the order of hundreds of miles.

FIGURE 4 illustrates diagrammatically a suitable type of pump station 44 wherein the pipeline 1 branches into a plurality (two, as shown) parallel sidings 45 and 46. A valve 47 controls entrance to siding 45 and a valve 48 controls entrance to siding 46. A valve 49 controls exit from siding 45 and a valve 50 controls exit from siding 46. A carrier fluid line 51 having a pump 52 therein has a branch 53 with valve 54 leading to the entrance end of siding 45, a branch 55 with valve 56 leading to the exit end of siding 45, a branch 57 with valve 58 leading to the entrance end of siding 46, and a branch 59 with valve 60 leading to the exit end of siding 46. Each siding may be half a mile or more in length.

In operation, a series of packages are led into siding 45 by opening valve 47 and closing valves 48, 49, 60 carrier fluid being circulated through siding 45 by means of line 51, valves 58, 56, 50 being open and valves 54, 60 being closed.

Valve 47 is then closed and valve 49 opened to discharge the packages in siding 45 with increased fluid pressure provided by pump 52. At the same time, valve 48 is opened, valve 50 closed, valve 60 opened, and valve 58 closed, to lead a series of packages into siding 46. When the series of packages have been discharged from siding 45, the operation is repeated to discharge the series of packages from 46 under increased pressure and insert another series of packages into siding 45.

Any suitable means may be provided for retrieving or recovering the packages from the terminal of the pipeline. One suitable means is illustrated in FIGURE 5 wherein the pipeline discharges into a tank 61 which collects the carrier fluid. The merging packages 23 are deposited onto a conveyor 62 from which they are collected, subjected to any desired treatment, and ultimately unpackaged.

Experiment has shown that the package velocity and pressure gradient are functions primarily of the average fluid velocity, the ratio of the package diameter to the pipe diameter, the package size and shape, the density differential between the package and fluid, the viscosity of the fluid, the inclination if the pipe and the linear concentration of packages within the pipe.

An unexpected feature of the invention is that in general the packaged material has a linear velocity greater than the average velocity of the supporting stream. This is illustrated in the following Table I for cylindrical packages and in the following Table II for spherical packages, wherein $V_p$ and $V_1$ are the package and average fluid velocities, respectively, and $d$ and $D$ are the package diameter and pipe diameter respectively.

Table I

Variation of $V_p/V_1$ with $V_1$ for 6-inch cylindrical packages (specific gravity=1.0, $d/D=0.9$) in a horizontal 1¼-inch diameter pipe with water as the fluid carrier

| $V_p/V_1$ | $V_1$ feet/second |
|---|---|
| 1.106 | 2.59 |
| 1.111 | 4.14 |
| 1.103 | 6.22 |
| 1.106 | 8.03 |
| 1.102 | 10.10 |
| 1.100 | 12.15 |

Table II

Variation of $V_p/V_1$ with $V_1$ for spherical packages (specific gravity=1.0, $d/D=0.9$) in a horizontal 1¼-inch diameter pipe with water as the fluid carrier

| $V_p/V_1$ | $V_1$ |
|---|---|
| 1.135 | 0.67 |
| 1.098 | 2.59 |
| 1.091 | 4.14 |
| 1.088 | 6.22 |
| 1.083 | 8.03 |
| 1.075 | 10.10 |
| 1.078 | 12.15 |

The ratio of the package diameter to the pipe diameter is important and the effect is different depending upon whether the package density is equal to, or different from, the fluid density. Thus, in the following Table III data are given for an equal density system, and in Table IV for a system in which the density of the packages is less than that of the fluid, a case pertinent to the flow of packages of agricultural products such as wheat for which the density is about 50 lb. per ft.$^3$, corresponding to a specific gravity of 0.8.

Table III

Variation of $V_p/V_1$ with $d/D$ for 6-inch cylindrical packages (sp. gr.=1.0) at an average water carrier velocity of 4.1 ft. per sec., in a horizontal 1¼-inch diameter pipe.

| $d/D$: | $V_p/V_1$ |
|---|---|
| 0.4 | 1.35 |
| 0.6 | 1.28 |
| 0.7 | 1.24 |
| 0.8 | 1.19 |
| 0.9 | 1.12 |

Table IV

Variation of $V_p/V_1$ with $d/D$ for 6-inch cylindrical packages (sp. gr.=0.8) at an average water carrier velocity of 4.1 ft. per sec., in a horizontal 1¼-inch diameter pipe.

| $d/D$: | $V_p/V_1$ |
|---|---|
| 0.4 | 0.85 |
| 0.6 | 0.98 |
| 0.7 | 1.05 |
| 0.8 | 1.09 |
| 0.9 | 1.09 |

In the equal-density system the velocity ratio decreases with increasing diameter ratio, and the opposite is the case with the unequal-density system, a result which is obviously of great significance.

The overall shape of a cylindrical package is also influenced by the length-to-diameter ratio and the individual end shapes. The effect of length differs in the equal density and unequal density systems. When the package density is essentially equal to the carrier fluid density, the package velocity increases with length-to-diameter ratio, while the opposite is the case for the unequal-density systems. In both cases, the effect is more marked at low diameter ratios and is relatively small at a diameter ratio of 0.9. The effect of end shape is such that the combination of an ellipsoidal front end and a flat or concave trailing end have a beneficial effect on the package velocity irrespective of the value of the package density relative to the fluid density.

In illustrating the effect of the density differential between the package and the fluid on the package velocity it is pertinent to compare the data already given in Tables III and IV for density differentials of 0 and 12.5 lbs. per ft.$^3$ with the data given in the following Table V for which the density differential is 112 lbs. per ft.$^3$. In Tables III and IV the average overall velocity is the same and it is seen that at a particular $d/D$ ratio the effect of the existence of a density differential is to cause the package to move slowly. This effect is very substantial at low $d/D$ ratios but becomes very small for $d/D$ ratios of the order of 0.9. In Table V the average overall velocity is considerably higher but the same trend is evident.

Table V

Variations of $V_p/V_1$ with $d/D$ for 6-inch cylindrical packages (sp. gr.=2.8) at an average water carrier velocity of 10 ft. per sec., in a horizontal 1¼-inch diameter pipe.

| $d/D$: | $V_p/V_1$ |
|---|---|
| 0.4 | 0.82 |
| 0.6 | 0.98 |
| 0.7 | 1.01 |
| 0.8 | 1.05 |
| 0.9 | 1.06 |

It is evident that even for packages for which the density differs greatly from the fluid density, the package velocity unexpectedly exceeds the average velocity of the liquid carrier. This effect is more noticeable at relatively high velocities and package-to-diameter ratios. It is also clear that for increasing density differentials the threshold velocity to establish not only package movement, but movement exceeding that of the supporting fluid continually increases.

Thus, in the following Table VI typical threshold velocities necessary to impart motion to packages having the same shape but increasing density differentials are given.

Table VI

Variation of threshold velocity for package movement with density differential for 6-inch cylindrical packages ($d/D$=0.9) in a horizontal 1¼-inch diameter pipe.

| Density differential lb./ft.$^3$: | Threshold velocity ft. per sec. |
|---|---|
| 74 | 0.20 |
| 177 | 0.35 |
| 255 | 0.50 |
| 460 | 0.85 |

The viscosity of the carrier fluid is of significance in that for a given pipe diameter and flow velocity the viscosity determines whether the fluid flow shall be laminar or turbulent. Laminar flow is characterized by no lateral mixing and a parabolic velocity profile. Turbulent flow, on the other hand, is characterized by lateral mixing and a consequent much flatter velocity profile. As a result, a shape or package occupying an axial position within the pipe moves at a relatively high velocity under laminar flow conditions. Furthermore, pressure losses in laminar flow tend to be low compared with those for turbulent flow. Since turbulence is no longer required for effective transportation (as it is in the case of slurries), packages are ideally transported under conditions for which laminar flow exists, at least in the annulus between the package and the pipe wall.

A spherical shape or package moves by both a rolling and sliding motion within the pipe. With increasing density differential the rolling motion predominates, and the restrictions resulting from the dragging of high-differential cylindrical packages especially at low velocities is thus overcome by the rolling motion.

Experiments have shown that, for spherical packages of a diameter of 9/10 of the pipe diameter, the slip velocity thereof varies from zero to 10% of the overall linear velocity for fluid velocity ranging from 2.5 to 12 feet per second in a horizontal 1¼-inch pipe. For packages of a diameter 4/10 of the pipe diameter the corresponding slippages varied from 2 to 65%.

In addition to the important variable package velocity which determines the overall throughput of packaged material, the pressure gradient is an important variable in that in combination with the total flow rate through the pipe it determines the pumping power required.

The following Tables VII, VIII and IX present experimental pressure gradient data for geometrically similar packages having specific gravities of 1.92, 3.83 and 5.30. The model packages were transported in a 1¼-inch diameter pipe by a light mineral oil. The diameter ratio was 0.9. In these tables $V_p$ is again the average overall velocity, $\Delta P/L$ is the measured pressure gradient calculated on the basis of a 100 percent linear fill of packages and the pressure gradient ratio is the ratio of pressure gradient for a 50 percent linear fill of packages to the pressure gradient which would exist if the carrier fluid flowed alone at the same average velocity. A 50 percent linear fill corresponds to a package flow rate of 56, 72, and 78 percent by weight of the total flow for package specific gravities of 1.92, 3.83 and 5.30, respectively.

Table VII

[Pressure gradient data for package specific gravity of 1.92]

| $V_p$, ft. per sec. | $\Delta P/L$, p.s.i./ft. | Pressure gradient ratio |
|---|---|---|
| 1.24 | 0.190 | 6.35 |
| 1.90 | 0.228 | 4.96 |
| 2.78 | 0.348 | 5.20 |
| 3.65 | 0.380 | 4.30 |
| 4.54 | 0.473 | 4.29 |
| 5.41 | 0.528 | 4.02 |
| 6.33 | 0.628 | 4.09 |
| 7.19 | 0.654 | 3.75 |

Table VIII

[Pressure gradient data for package specific gravity of 3.83]

| $V_p$, ft. per sec. | $\Delta P/L$, p.s.i./ft. | Pressure gradient ratio |
|---|---|---|
| 1.24 | 0.265 | 8.80 |
| 1.90 | 0.327 | 7.10 |
| 2.78 | 0.387 | 5.75 |
| 3.65 | 0.483 | 5.45 |
| 4.56 | 0.565 | 5.10 |
| 5.41 | 0.651 | 4.96 |
| 6.31 | 0.741 | 4.84 |
| 7.19 | 0.785 | 4.50 |
| 7.20 | 0.801 | 4.59 |

Table IX

[Pressure gradient data for package specific gravity of 5.30]

| $V_p$, ft. per sec. | $\Delta P/L$, p.s.i./ft. | Pressure gradient ratio |
|---|---|---|
| 1.13 | 0.304 | 11.1 |
| 1.53 | 0.286 | 7.70 |
| 1.90 | 0.364 | 7.80 |
| 2.78 | 0.446 | 6.62 |
| 3.65 | 0.529 | 6.00 |
| 4.54 | 0.596 | 5.40 |
| 5.41 | 0.658 | 5.00 |
| 6.29 | 0.742 | 4.86 |
| 7.19 | 0.810 | 4.64 |

It is therefore apparent that, irrespective of the specific gravity of the packages, the pressure gradient ratio decreases with increasing average velocity. This decrease takes place while the velocity ratio previously defined increases.

Now, it is extremely important to note that the pressure gradient data are given for a situation in which the carrier fluid was in laminar flow both when carrying the packages and when flowing alone. It will be apparent that other possibilities exist, i.e., the carrier fluid may be in laminar flow when carrying the packages but in turbulent flow when flowing alone or the carrier fluid may be in turbulent flow in both situations. It is known from theoretical analyses of the concentric flow of equal-density packages that the pressure gradient ratio for the laminar-laminar case exceeds that for the turbulent-turbulent case and greatly exceeds that for the laminar-turbulent case. Consequently, the data given for the pressure gradient ratio can be regarded as extremely conservative (assuming that the same trend applies to unequal-density systems and to the pressure gradient for package transport for the other two cases) must be very reasonable bearing in mind the high solids throughput on a weight basis. For example, the calculated pressure gradient for the flow of cylindrical packages in a concentric position under turbulent flow conditions and a linear concentration of 100 percent is shown as a function of the ratio of packages diameter to pipe diameter in FIGURE 6. It is apparent that for a diameter ratio of 0.9 the increase in pressure gradient is only some 30%. This increase may be compared with the increase of 300% which would be theoretically expected for the same situation except that laminar flow conditions prevail in the fluid carrier, and the very great increase expected for a diameter ratio of approximately unity (i.e., for a piston type displacement action used in the conveyance of "rabbits" and containers with a pneumatic system).

A further important and unexpected result is that at the higher velocities the pressure gradient ratio becomes substantially independent of package specific gravity, showing that more dense materials can be transported for approximately the same power consumption as less dense materials, a result which is very different from that obtained for the flow of solids in suspension.

While the results reported are for a diameter ratio of 0.9, results showing similar trends have been obtained for lower diameter ratios.

A most important and critical aspect of the invention resides in the fact that the materials to be transported are packaged for only one specific purpose, namely, the transportation of such materials. Thus, each particular material may be packaged in a manner best suited for the most efficient transportation thereof, i.e., in a manner which gives the lowest overall cost per unit of substance transported. The primary considerations in the packaging operation are:

(1) It is possible to select the basic package shape, which may be cylindrical or spherical. While a higher load factor makes the cylindrical form generally more desirable, the almost complete absence of sliding friction in the case of spherical packages can make this form more desirable, especially when the bulk density of the packages is relatively high.

(2) It is possible to select the diameter of the packages, whether cylindrical or spherical. The ratio of the package diameter to pipe diameter is an important variable in the relationship between volumetric throughput of packages and the pumping power required.

(3) It is possible in the case of cylindrical packages to select both the optimum length and end shape, variables which have an influence on the velocity and stability of the flowing packages.

(4) It is possible to adjust the density of the package so that there can be prepared the substantially equal-density package which attains ideal flow conditions, i.e., it flows in the pipe with minimum power requirement, maximum velocity, a very favorable load factor, a minimum of mechanical damage due to abrasion by the pipe wall, and a very low fluid velocity (which is desired in small diameter lines) for low carrier fluid pressure gradients.

(5) It is possible, in the case of a common-carrier pipeline in which more than one substance is being transported in addition to the fluid carrier, to adjust the variables for each set of packages in such a way that the linear velocities of each set are essentially the same—a requirement for the smooth, uninterrupted operation of the pipeline.

While it will be recognized that the transport of equal-density cylindrical packages approaches optimum efficiency in the practice of the present invention, it will be appreciated that effective results are achieved with packages of greater and lesser density in both cylindrical and substantially spherical form. The ratio of the density of the packages to that of the stream should be in the range (10 to 1) to (0.7 to 1). The ratio of the density of cylindrical packages to that of the carrier should be in the range (5 to 1) to (0.7 to 1). The ratio of the density of the substantially spherical packages to that of the carrier should be in the range 10 to 3.

As previously indicated, the maximum diameter of the package is less than the internal diameter of the pipeline. The preferred range of the ratio $d/D$ is 0.7 to 0.95. The optimum value of this ratio for horizontal transport of a single commodity is 0.9.

Since the common carrier principle may be employed, a train of packages of one commodity may be readily followed by a train of a second commodity, and so on, to include an appreciable number of commodities. The diameter ratio is one of the variables which may be adjusted to cause these trains of packages having, in general, differing densities to move at the same velocity. Consequently, each commodity in such a case would be packaged to give a definite invariable diameter ratio to ensure smooth operation of the pipeline.

Shape control is advantageous in equal-density cylindrical packages to avoid abrasion by buffeting. A suitable shape is one in which the leading end is convex, the cross section is substantially parabolic, and the trailing end is slightly concave.

Further, for substantially cylindrical packages which are more or less dense than the carrier fluid the parabolic leading-end shape is of considerable importance in sustaining movement of the dense package within the pipe since it provides a special interaction among the package, the pipe wall and the carrier liquid. This is a lubrication phenomenon, similar to that of slipper bearings, and it acts to give an unexpected ease of movement to the dense packages.

As previously indicated, the density of the package may be adjusted with respect to that of the supporting fluid which may, for example, be water, an aqueous solution or crude oil.

The equal-density package is carried as a segment of the fluid stream in the pipeline. The following features are of primary significance in this regard:

(a) the pressure gradient in a line carrying equal-density packages is commonly and unexpectedly little greater than that of a simple fluid-filled line with the same volumetric throughput in turbulent flow.

(b) the velocity of the equal-density package is greater than that of the fluid, at all fluid velocities.

(c) the package flows in an axial position at velocities greater than about 1.5 feet per second, and less than 0.5 feet per second, in a horizontal 1¼-inch pipe, thus minimizing abrasion with the pipe wall.

(d) the shape effect in equal-density packages is unexpectedly such that increase in both the length and diameter gives increasingly stable flow to the package.

The density of the material to be transported is commonly greater than that of the supporting fluid. Advantage can thus be taken of the unexpectedly favorable features of equal-density package pipelining by reason of the facility with which the effective density can be adjusted. Thus, for example, gas may be entrained in solid or semi-solid material in a dispersed form, as in foamed material, in an amount to produce a package material of effective density equal to that of the supporting fluid; for example, sulphur may be converted to foamed sulphur of specific gravity equal to one when carried in water.

It is apparent that the proposed mode of transport obviates the disadvantages attached to the transport of solids as finely divided suspensions in that the problem of the separation of the solid from the fluid carrier is all but eliminated, the solid need not be ground to a finely divided state, the attrition of the solid is non-existent and the abrasion of the pipe and fittings is substantially reduced. In addition, the use of an envelope or sprayed coating eliminates the mutual contamination of solid and fluid carried. Furthermore, the methods by which the solid forms are fabricated create packages with a very definite economic advantage over the rigid containers referred to previously.

The words "shape" and "package" are used synonymously throughout this specification and claims to mean an object molded directly to a specific shape from the substance itself to be transported with or without a form-retaining aid.

We claim:
1. A method of transporting a granular solid substance which comprises
   (a) establishing a pipeline having a substantially uniform internal diameter and extending from a first location to a second location many miles distant from said first location,
   (b) continuously pumping a carrier fluid through said pipeline,
   (c) forming said granular solid substance into a multiplicity of substantially uniform shapes each having an axis of approximate symmetry and a substantially circular contour about said axis, the maximum diameter of each said shape being less than said internal diameter of said pipeline,
   (d) bonding together substantially all of the surface granules of each said shape to form a protective enclosure therefor containing unbonded granules,
   (e) each said shape having a ratio of density to that of said carrier stream of (10 to 1) to (0.7 to 1),
   (f) inserting at said first location said shapes in axially aligned order and at spaced intervals into said pipeline for entrainment by said carrier fluid to form a continuously moving stream flowing from one to the other of said locations and composed of said carrier fluid and said shapes in spaced single row distribution in said fluid, and
   (g) removing said inserted shapes from said pipeline at said second location.

2. A method of transporting a granular solid substance as defined in claim 1, wherein said bonding step comprises mixing a bonding agent with said surface granules.

3. A method of transporting a granular solid substance as defined in claim 1, wherein said granules are fusible and said bonding step comprises heating said shapes to fuse together said surface granules.

References Cited

UNITED STATES PATENTS

| 2,672,372 | 3/1954 | Jones et al. | 302—66 |
| 3,190,701 | 6/1965 | Berlowitz et al. | 302—66 |

FOREIGN PATENTS

| 673,280 | 10/1963 | Canada. | |

ANDRES H. NIELSEN, *Primary Examiner.*